United States Patent [19]

Lustig et al.

[11] Patent Number: 4,740,400
[45] Date of Patent: Apr. 26, 1988

[54] TINTED HEAT-SHRINKABLE MULTILAYER FILMS COMPRISING A VINYLIDENE CHLORIDE-VINYL CHLORIDE COPOLYMER

[75] Inventors: Stanley Lustig, Park Forest; Stephen J. Vicik, Darien; John A. Ransford, Burbank, all of Ill.

[73] Assignee: Viskase Corporation, Chicago, Ill.

[21] Appl. No.: 845,166

[22] Filed: Mar. 27, 1986

[51] Int. Cl.⁴ .................. B65D 25/06; B32B 27/08
[52] U.S. Cl. ...................................... 428/35; 428/323; 428/518; 428/520; 428/910
[58] Field of Search ................ 428/518, 520, 323, 35

[56] References Cited

U.S. PATENT DOCUMENTS 1,836,702 12/1931 Christmann .
3,352,882 11/1967 Caldo et al. .
3,389,004 6/1968 Dressler et al. .
3,391,104 7/1968 Harris et al. .
4,048,428 9/1977 Baird et al. .

FOREIGN PATENT DOCUMENTS 0078535 5/1983 European Pat. Off. .
0095299 11/1983 European Pat. Off. .
2040804A 9/1980 United Kingdom .
2123747A 2/1984 United Kingdom .

Primary Examiner—P. C. Ives
Attorney, Agent, or Firm—John C. LeFever

[57] ABSTRACT

A transparent heat shrinkable, multilayer film comprising:
(a) at least one layer comprising a vinylidene chloride-vinyl chloride copolymer; and
(b) at least one layer comprising a thermoplastic polymer; and
(c) a sufficient amount of a dioxazine violet pigment to provide a film which retains an aesthetically acceptable violet appearance despite exposure to elevated temperatures and/or irradiation.

14 Claims, 1 Drawing Sheet

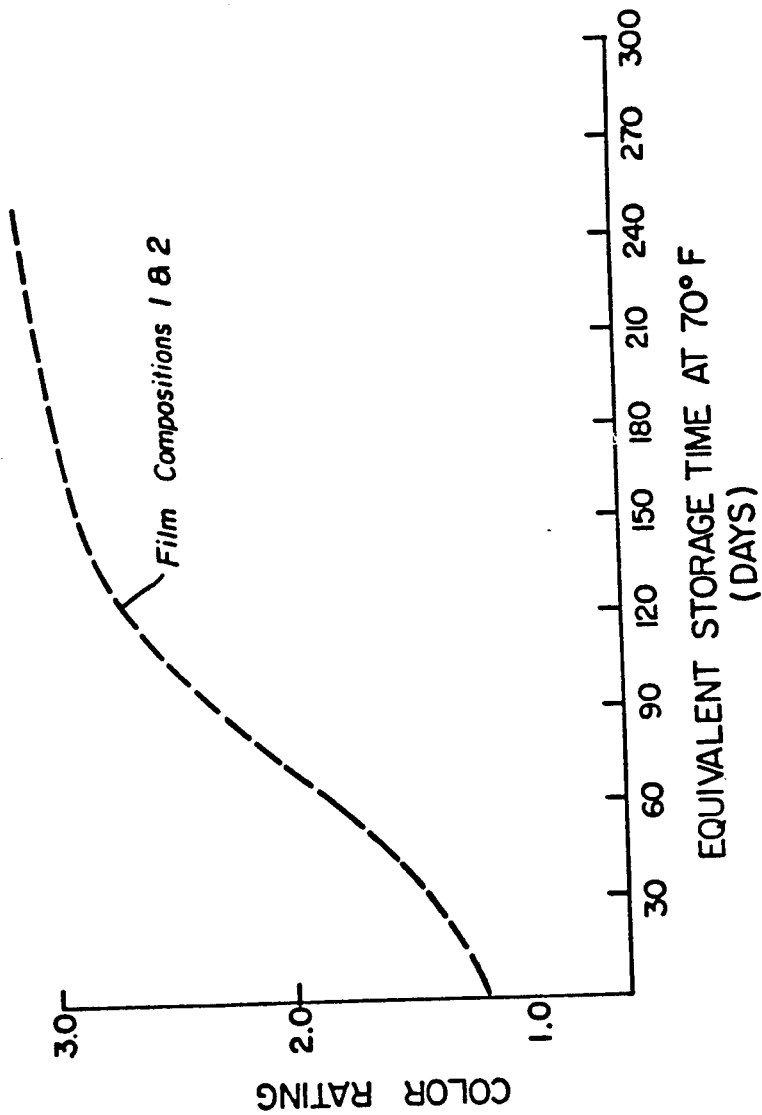

TINTED HEAT-SHRINKABLE MULTILAYER FILMS COMPRISING A VINYLIDENE CHLORIDE-VINYL CHLORIDE COPOLYMER

FIELD OF THE INVENTION

This invention relates to tinted, transparent, heat-shrinkable, multilayer films suitable for use in packaging primal and sub-primal meat cuts, wherein said film comprises at least one layer comprising a vinylidene chloride-vinyl chloride copolymer. This invention also relates to bags produced from said films.

BACKGROUND OF THE INVENTION

Films used in meat packaging applications are generally multilayer compositions having at least one layer capable of providing the film with good oxygen barrier properties. Frequently, the barrier layer of these films comprises a vinylidene chloride - vinyl chloride copolymer, commonly designated as polyvinylidene chloride or PVDC. Although PVDC layers generally provide films with relatively low rates of gas transmission, over a period of time PVDC copolymers tend to degrade, forming degradation products which include chromophores. The presence of chromophores accounts for the yellow tint often observed in PVDC-containing films.

A pronounced yellow tint is generally unacceptable in films used to package meat products, particularly fresh red meat cuts. Films so tinted tend to impart a yellow appearance to meat fat which customers frequently associate with undesirable product aging or spoilage.

Exposure to elevated temperatures and/or irradiation generally accelerates the rate of PVDC degradation, thereby accelerating the rate of chromophore production and intensifying the degree of film yellowing. However, irradiation of PVDC-containing films often improves properties such as the puncture resistance, tensile strength and toughness thereof. Accordingly, in the production of PVDC-containing films for meat packaging applications, manufacturers must frequently weigh the undesirability of film discoloration against the property benefits obtained by irradiation. Additionally, undesirable film yellowing may result from polymeric resins reaching degradation inducing temperatures during film extrusion. When this occurs it is common practice to stop production to remove the yellowed resin from a system. Thus, in terms of system shut-down time and raw material loss, this type of thermally induced PVDC degradation can have an economically disadvantageous impact on film production.

Prior to this invention, several attempts were made to produce a PVDC-containing film suitable for meat packaging applications by the incorporation of one or more acceptable pigments into same. That is, only certain film colors are considered aesthetically acceptable in meat packaging with PVDC-containing films. These attempts resulted in films wherein discoloration was either ineffectively masked or wherein the pigmented films took on an undesirable tint following irradiation and/or elevated temperature exposure. Masking has been found to be particularly difficult since throughout the period of film storage the color being masked is continuously intensifying.

Accordingly, it is an object of this invention to provide a transparent heat-shrinkable, vinylidene chloride-vinyl chloride copolymer-containing film which has an aesthetically acceptable appearance for packaging fresh and processed meats. It is a further object of this invention to provide a transparent heat shrinkable, vinylidene chloride-vinyl chloride copolymer-containing film which upon exposure to elevated temperature and/or irradiation retains an aesthetically acceptable appearance for meat packaging applications, preferably, over extended storage periods.

Definitions

For purposes of defining this invention the following definitions shall apply:

Hunter Color Scales—L, a and b—The amount of one of three stimuli, each representing different dimensions of the Hunter Opponent-Colors System, which in combination define a color for Standard Observer CIE 1931 (2°).

Hunter a-Value—A value on the Hunter red-green chromaticity scale which provides a measure of specimen redness when positive and specimen greenness when negative.

Hunter b-Value—A value on the Hunter yellow-blue chromaticity scale which provides a measure of specimen yellowness when positive and specimen blueness when negative.

Hunter L-Value—A value on the Hunter white-black chromaticity scale of 0 to 100, wherein zero represents black and 100 represents white, which provides a measure of specimen lightness.

Tristimulus Test—The following test procedure:

A Tristimulus colorimeter manufactured by Hunter Associates Laboratory, Inc. of Reston, Va., designated as Model D25A-9, operating under the Test Conditions hereinafter defined, is calibrated against a White Standard having a Hunter a value of $-0.9$, a Hunter b value of $-1.7$ and a Hunter L value of 91.31. The calibrated instrument is thereafter used to obtain the Hunter a, b and L values of a single thickness of a transparent film specimen measured against a white tile background, wherein said white tile background has Hunter a, b and L values of $-0.75$, $+1.29$, and 91.68 respectively. The procedure is repeated five times at different specimen locations with the values reported being an average of the five measurements obtained.

Test Conditions

A 45° angle of illumination to the specimen normal; a 0° viewing angle to the normal; a subtended source aperture angle of 7°; a subtended receptive aperture angle of 11°; an aperture diameter of 2 inches (51 mm); type DZA low voltage halogen lamp; spectral light being excluded from the viewed light; and the spectral response being adjusted for average daylight designated as CIE Illuminate C.

Visible Yellowing—A color within the visible light spectrum characterized by a wavelength range of from about 560 to about 590 nanometers.

SUMMARY OF THE INVENTION

In one embodiment the instant invention comprises a transparent heat shrinkable, multilayer film comprising:
  (a) at least one layer comprising a vinylidene chloride-vinyl chloride copolymer;
  (b) at least one layer comprising a thermoplastic polymer; and
  (c) a sufficient amount of a dioxazine violet pigment to provide the film with a violet tint after having been subjected to a temperature of 120° F. for a period of 3 days, and preferably for a period of 7 days. As used herein, "violet tint" means a color within the visible light spectrum which is characterized by a wavelength range of from about 380 to about 440 nanometers. In a preferred embodiment, the violet tint is described by a Hunter L-Value within a range of from about 80 to about 90, a Hunter a-Value within a range of from about +0.25 to about +6, and a Hunter b-Value within a range of from about −0.25 to about −7, as per the Tristimulus Test.

In another embodiment this invention relates to a transparent heat shrinkable, multilayer film comprising:
(a) at least one irradiated layer comprising a vinylidene chloride-vinyl chloride copolymer;
(b) at least one layer comprising a thermoplastic polymer; and
(c) a sufficient amount of a dioxazine violet pigment to provide the film with a violet tint, wherein said tint is preferably described by a Hunter L-Value within a range of from about 80 to about 90, a Hunter a-Value within a range of from about +0.25 to about +6, and a Hunter b-Value within a range of from about −0.25 to about −7 as per the Tristimulus Test.

In a further embodiment this invention comprises a transparent, heat shrinkable multilayer film comprising:
(a) at least one layer comprising a vinylidene chloride-vinyl chloride copolymer, said layer(s) being visually perceived as having a yellow tint absent pigmentation thereof;
(b) at least one layer comprising a thermoplastic polymer; and
(c) a sufficient amount of a dioxazine violet pigment to provide the film with a Hunter L-Value within a range of from about 80 to about 90, a Hunter a-Value within a range of from about +0.25 to about +6, and a Hunter b-Value within a range of from about −0.25 to about −7 as per the Tristimulus Test.

BRIEF DESCRIPTION OF THE DRAWING

FIG. 1 is a graphic representation of color development in irradiated films after various storage periods.

DETAILED DESCRIPTION OF THE INVENTION

It has been found that unlike other pigments known to the inventors which produce colored films which are acceptable to the meat industry, but which are not effective in masking a yellow color, a dioxazine violet pigment may be incorporated into a multilayer film having a vinylidene chloride-vinyl chloride copolymer-containing layer to effectively mask the yellow color of vinylidene chloride-vinyl chloride copolymer derived chromophores. Additionally, it has been found that a film pigmented with a dioxazine violet generally retains its violet tint even after exposure to elevated temperature and/or irradiation, and that a film so pigmented typically retains a violet tint over an extended storage period, often for periods in excess of 1 year at 70° F. This is a remarkable discovery in view of the fact that the yellow color of the PVDC layer continues to intensify as the film ages. Films having tints described by Hunter-Values within the previously defined ranges are found to be particularly well suited for meat packaging applications.

In contrast, based on our present knowledge we believe that multilayer films containing other violet pigments which are not dioxazine compounds will not retain the violet tint after exposure to radiation and/or elevated temperatures. For example, Violet 19 (color Index No. 46500) is a quinacridone chemical class compound which will cause an irradiated PVDC-containing multilayer film to acquire an orange red cast, which is an unacceptable color for the packaging of primal and subprimal meat cuts.

The violet pigments suitable for use herein are included among the class of dioxazine compounds more particularly described in U.S. Pat. Nos. 2,016,013; 2,026,092; 2,082,344; 2,115,508; 2,244,294; 2,918,465; 2,954,378; 3,009,913; 3,065,229; 3,130,195; and 3,310,556. Included among such pigments are compounds of the formula:

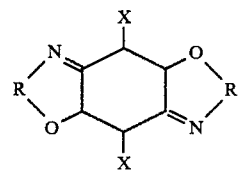

Formula I wherein X is selected from the group consisting of hydrogen, halogen radicals, alkyl radicals and aryl radicals, and R is a substituted or unsubstituted aromatic or heterocyclic radical bound by two adjacent carbon atoms.

Among the above described Formula I compounds are compositions wherein X is selected from the group consisting of hydrogen, chlorine and bromine, and R is selected from the group consisting of phenyl, naphthyl, anthryl, phenanthryl, carbazolyl, dibenzofuryl, dibenzothienyl, fluoryl, and xanthyl radicals.

It is well accepted in the art that pigments identified as having the structure previously defined by Formula I will exhibit variations in color depending upon the precise chemical identity thereof. Those pigments of interest herein are violet dioxazines which when used in sufficient quantity impart a violet tint to PVDC-containing films.

Carbazole dioxazine violets of the formula:

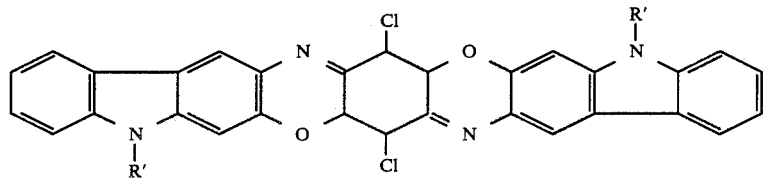

Formula II wherein R' is selected from the group consisting of hydrogen, alkyl radicals and benzyl radicals, are found to be particularly well suited to the practice of this invention, with carbazole dioxazines of the formula:

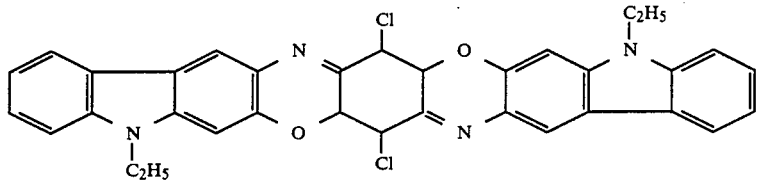

Formula III being especially desirable.

Carbazole dioxazine violets may be prepared by a two-step reaction, wherein an amino ethyl carbazole is first condensed with chlorinal in a high-boiling solvent and the resulting condensation product is thereafter reacted with a ring closing agent (e.g. benzene sulfonyl) to produce a crude product which may be subjected to one or more refining processes to produce a pigment of desired purity. Various methods for producing carbazole dioxazine violet pigments are described in U.S. Pat. Nos. 2,857,400 and 3,022,299.

The heat shrinkable multilayer films of the present invention are characterized as having at least one layer comprising a vinylidene chloride-vinyl chloride copolymer. Vinylidene chloride-vinyl chloride copolymers suitable for use herein typically contain a minimum of about 65 weight percent vinylidene chloride, and preferably contain from about 70 to about 95 weight percent of vinylidene chloride, based on the weight of the copolymer. At vinylidene chloride concentrations less than 65% by weight, vinylidene chloride-vinyl chloride copolymers generally exhibit unsatisfactory oxygen barrier properties, whereas, at concentrations in excess of 95% the copolymer is generally not extrudable. The remainder of the copolymer is preferably vinyl chloride, but it may include acrylonitrile, an acrylate ester such as methyl methacrylate, and the like. In order to aid in extrusion, the copolymer may further comprise a plasticizer in an amount not in excess of 5 weight percent, but preferably less than 4 weight percent, based on the weight of the copolymer. Plasticizers suitable for use herein include compositions such as dibutyl sebacate and epoxidized soybean oil.

The films of this invention have one or more additional thermoplastic layers comprising film grade polymers which include ethylene-vinyl acetate copolymers; polyethylene; polypropylene; polybutylene; linear and/or branched copolymers of ethylene and $C_3$ to $C_{18}$ alpha-olefins; ionomers; and mixtures thereof. The combination of layer structure and components should be selected in such a manner so as to provide a transparent heat shrinkable film suitable for meat packaging applications.

In one embodiment, the film of this invention has at least two layers, one of said layers comprising a vinylidiene chloride-vinyl chloride copolymer and another of said layers comprising a thermoplastic polymer such as, for example, an ethylene vinyl acetate copolymer. Films comprising a first outer layer comprising a thermoplastic polymer, for example an ethylene-vinyl acetate copolymer; a core layer comprising a vinylidene chloride-vinyl chloride copolymer; and a second outer layer comprising a thermoplastic polymer, for example an ethylene-vinyl acetate copolymer, are also suitable for use herein.

In a preferred embodiment, the ethylene-vinyl acetate copolymers of this invention include compositions selected from the group consisting of (a) an ethylene-vinyl acetate copolymer having a melt index of from about 0.1 to about 1.0 decigram per minute and a vinyl acetate content of from about 9 to about 18 weight percent, and preferably from about 10 to about 15 weight percent, based on the weight of said ethylene-vinyl acetate copolymer, and (b) a blend of two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer, wherein said blend has a total vinyl acetate content of from about 9 to about 18 weight percent, and preferably from about 10 to about 15 weight percent, based on the combined weight of said ethylene-vinyl acetate copolymers.

The films of this invention generally have thicknesses ranging from about 1.75 to about 3.0 mils, with film thickness depending in part upon the particular layer structure. At thicknesses in excess of 3.0 mils, clipping problems may be encountered in bags produced therefrom, whereas at thicknesses less than 1.75 mils, the film may have undesirably low puncture resistance. Typically, the PVDC layers of the subject films have thicknesses ranging from about 0.25 to about 0.45 mil.

The tinted films of this invention may be produced by the incorporation of dioxazine violet pigment into one or more film layers. For ease and convenience in film manufacturing, it is generally preferred that the pigment be used in the form of a resin concentrate. Resin concentrates may be prepared using any suitable method for dispersing solid materials in polymers, for example by extrusion or milling. In general, polymers suitable for use in resin concentrates are those polymers which are compatible with the film layer into which the pigment is introduced. By compatible it is meant that the polymer is at least dispersible in the film layer into which it is incorporated. In general, a resin concentrate may contain pigment in an amount of up to about 1 percent by weight, based on the total weight of the pigment and resin components thereof, and typically contains pigment in an amount of from about 0.5 to about 1 percent by weight, based on the total weight of the pigment and resin components thereof.

Pigment may be incorporated into a film by combining a resin concentrate with the feed material of one or more film layers by any suitable mixing method. The amount of resin concentrate incorporated into a given film layer is variable and depends upon factors which include the number of layers into which pigment will be incorporated, the polyvinylidene chloride content of the film, and the degree of thermal and/or radiation exposure said polyvinylidene chloride is subjected to. Desirably, a film should contain sufficient pigment to provide a film which, despite exposure of a PVDC layer thereof to radiation levels in excess of about 1 megarad, and more particularly to dosage levels between about 3 and about 5 megarads, retains an aesthetically acceptable violet tint, preferably for storage periods in excess of 200 days at temperatures of about 70° F. and most preferably for storage periods in excess of 300 days at temperatures of about 70° F.

Preferably, PVDC-containing multilayer films suitable for use in meat packaging applications are produced by the incorporation therein of dioxazine violet pigment in an amount of from about 0.01 to about 0.04 percent by weight, based on the total weight of the vinylidene chloride-vinyl chloride copolymer present in same.

At pigment concentrations less than about 0.01 percent by weight, based on the weight of the vinylidene chloride-vinyl chloride copolymer, film yellowing may be inadequately masked, whereas, at pigment concentrations in excess of about 0.04 percent by weight, based on the weight of the vinylidene chloride-vinyl chloride copolymer, the violet tint imparted to a film may be so intense as to alter the natural color of meat products packaged therein.

Following incorporation of pigment into the feed material of one or more layers, said feed material may be extruded by known techniques to produce a tubular or flat multilayer extrudate which is thereafter biaxially stretched to produce a heat shrinkable film. For example, feed material forming the various film layers may be co-extruded through a circular die to produce a multilayer primary tube which is thereafter biaxially stretched by means of the "double bubble" technique disclosed in U.S. Pat. No. 3,555,604 to Pahlke. Alternatively, the feed material forming the various film layers may be slot cast to produce a multilayer film which is thereafter biaxially stretched by tentering techniques. Following biaxial stretching, the multilayer film may be irradiated to a desired dosage level such as by passing same through an electron beam irradiation unit.

In another aspect of this invention, bags suitable for the shrink packaging of primal and sub-primal meat cuts are provided from the afore-described multilayer films. The bags may be produced from the multilayer films of this invention by heat sealing. For instance, if the films of this invention are produced in the form of tubular film, bags can be produced therefrom by heat sealing one end of a length of the tubular film or by sealing both ends of the tube and then slitting one edge to form the bag mouth. If the films of this invention are made in the form of flat sheets, bags can be formed therefrom by heat sealing three edges of two superimposed sheets of film. When carrying out the heat sealing operation, the surfaces which are heat sealed to each other to form seams are the said first outer layers of the films of the invention. Thus, for example, when forming a bag by heat sealing one edge of a length of tubular film, the inner surface of the tube, i.e., the surface which will be heat sealed to itself, will be the said first outer layer of the film.

The following examples are intended to illustrate, but in no way limit the present invention.

Example I

Biaxially stretched three-layer films were prepared by a "double bubble" process similar to that disclosed in U.S. Pat. No. 3,456,044, by co-extruding the polymeric materials forming the various film layers through a multilayer die to produce a primary tube which was thereafter biaxially stretched to produce a heat shrinkable film. The stretched films were thereafter irradiated to a dosage level of about 3 megarads, wound into webs, and maintained at a temperature of 120° F. to simulate storage periods of up to about 250 days at 70° F. At various time intervals the films were compared to a set of color standards and given a numerical rating. Film colors were rated on a scale of 1 to 3 wherein 1 represented a slight yellow tint, 2 represented a moderate yellow tint and 3 represented a relatively dark yellow tint which was deemed unacceptable for meat packaging applications. The change in film color over time is graphically illustrated in FIG. 1 wherein the color data for films 1 and 2 have been combined.

The film designated herein as film 1 had an inner layer of ethylene-vinyl acetate copolymer having a melt index of about 0.25 decigram per minute and a vinyl acetate content of about 12 percent by weight, based on the weight of the copolymer; a core layer of vinylidene chloride-vinyl chloride copolymer containing about 85 weight percent vinylidene chloride and about 15 weight percent vinyl chloride, based on the weight of the copolymer; and an outer layer comprising a blend of (a) about 75 weight percent of ethylene-vinyl acetate copolymer having a vinyl acetate content of about 12 weight percent, based on the weight of the copolymer and a melt index of about 0.35 decigram per minute, and (b) about 25 weight percent of ethylene-vinyl acetate copolymer having a vinyl acetate content of about 4.5 weight percent, based on the weight of the copolymer and a melt index of about 0.25 decigram per minute. Film 1 had a total thickness of 2.4 mils.

The film designated herein as film 2 had the same composition as film 1, except that the outer layer comprised an ethylene-vinyl acetate copolymer having a vinyl acetate content of about 15 weight percent, based on the weight of the copolymer and a melt index of about 0.5 decigram per minute. Film 2 had a total thickness of 2.4 mils.

EXAMPLE II

Biaxially oriented three-layer films having the compositions described in Table I were prepared by the "double-bubble" process disclosed in U.S. Pat. No. 3,456,044. In producing the films, the polymeric materials forming the various film layers were first co-extruded through a multilayer die to produce a primary tube; the primary tube was thereafter biaxially stretched to produce a secondary tube which was then irradiated to a dosage level of about 3 megarads. Following irradiation, the films designated as film nos. 3 and 4 were wound into webs and maintained at a temperature of 120° F. for a period of four days to simulate a storage period of 100 to 120 days at 70° F.; the films designated as film nos. 5 to 8 were wound into webs and maintained at a temperature of 120° F. for a period of three days to simulate a storage period of 75 to 90 days at 70° F.

As used in Table I, the following designations are as herein defined:

Red concentrate—A resin concentrate available from Amerchem, Inc. under the product designation "Red 3083-E4".

Blue concentrate—A resin concentrate available from Americhem, Inc. under the product designation "Blue 7176-E1".

Red-Blue concentrate—a resin concentrate containing three parts by weight of blue to one part by weight of red, of the previously described red and blue concentrates.

Following irradiation, the film designated as film 3 had a yellow tint which was intensified by accelerated aging. Film No. 25 had a blue color which turned to green upon irradiation and, since the green color was unacceptable, no accelerated aging at 120° F. was undertaken. Films No. 26 and 27 both had a dark reddish brown tint upon manufacture and, because this color was unacceptable to begin with, no irradiation was undertaken since the irradiation would only create a darker unacceptable color. Following irradiation, films 4 through 8 all had an undesirable greenish-gray cast which was intensified by accelerated aging. None of the pigment combinations of Example II were successful in masking the film yellowing which took place during irradiation and accelerated aging.

TABLE I

| Film No. | Layer Composition[1] | | |
|---|---|---|---|
| | First Outer Layer[2] | Core Layer[3] | Second Outer Layer[4] |
| 3 | EVA | PVDC | EVA |
| 25 | EVA | PVDC | 99.9% EVA |
| | | | 0.1% Blue concentrate |
| 26 | EVA | PVDC | 99.75% EVA |
| | | | 0.25% Red concentrate |
| 27 | EVA | PVDC | 99.5% EVA |
| | | | 0.5% Red concentrate |
| 4 | EVA | PVDC | 95% EVA |
| | | | 3.75% Blue concentrate |
| | | | 1.25% Red concentrate |
| 5 | EVA | PVDC | 91.5% EVA |
| | | | 3.5% Blue concentrate |
| | | | 5.0% Red concentrate |
| 6 | EVA | PVDC | 91% EVA |
| | | | 3.0% Blue concentrate |
| | | | 6.0% Red concentrate |
| 7 | EVA | PVDC | 94.0% EVA |
| | | | 4.0% Red concentrate |
| | | | 2.0% Red-Blue concentrate |
| 8 | EVA | PVDC | 92.0% EVA |
| | | | 4.0% Red concentrate |
| | | | 4.0% Red-Blue concentrate |

[1]The films produced in accordance with Example II had a total thickness of 2.40 mils; with the first outer layer having a thickness of 1.42 mils, the core layer having a thickness of 0.34 mil, and the second outer layer having a thickness of 0.64 mil.
[2]The EVA copolymer used to produce the first outer layer of Example II films had a vinyl acetate content of 11 percent by weight, based on the total weight of the copolymer, and a melt index of 0.25.
[3]The PVDC copolymer used to produce the core layer of Example II films had a vinyl chloride content of 15 percent by weight, based on the total weight of the copolymer.
[4]The EVA copolymer used to produce the second outer layer of Example II films had a vinyl acetate content of 10.5 percent by weight, based on the total weight of the copolymer, and a melt index of 0.35.

EXAMPLE III

Multilayer films were made in accordance with the procedure of Example II, except that following irradiation the films were maintained at a temperature of 120° F. for a period of one week to simulate an aging period of 175 to 210 days at 70° F. The composition of the various films tested is provided in Table II along with a description of film color following irradiation and accelerated aging. The colors designated as rose violet, deep rose violet, pale violet, medium violet, and deep violet were all deemed aesthetically acceptable for meat packaging applications. That is, samples containing at least 2.5 wt. % Violet 23 concentrate in the second outer layer of EVA effectively masked the yellow color of the irradiated PVDC-containing films, while samples containing 2.0 wt. % Violet 23 concentrate in this layer did not provide acceptable masking of the yellow color. It is to be noted that 2.5 wt. % of Violet 23 concentrate in the second outer layer of EVA corresponds to the preferred lower limit of pigment which was defined hereinabove as being 0.01 percent by weight of Violet 23 pigment in the multilayer film, based upon the total weight of PVDC copolymer contained in the film.

Violet 23 concentrate, as designated in Table II, is a resin concentrate containing 0.5 percent by weight, based on the total weight of the EVA and pigment components thereof, of a carbazole dioxazine pigment identified as Violet 23, available from American Hoechst under the product designation HOSTAPERM Violet RL Special 14-4007, and 99.5 percent by weight based on the total weight of the EVA and pigment components thereof, of an EVA copolymer.

The EVA and PVDC resins used to form the first outer layers, second outer layers and core layers of the films of this Example are as described in Example II.

The data presented in Table II shows that, when used in sufficient concentration, the pigment designated as Violet 23 provided an irradiated PVDC-containing film with an aesthetically acceptable tint over an extended period of time.

TABLE II

| Film No. | Layer Structure* | | | Color After Irradiation At 3 megarads | Color After 7 days at 120° F. |
|---|---|---|---|---|---|
| | First Outer Layer | Core Layer | Second Outer Layer | | |
| 9 | EVA (1.26) | PVDC (0.34) | 99.5% EVA (0.50) 0.5% Violet 23 concentrate | Colorless | Yellow - Tan** |
| 10 | EVA (1.26) | PVDC (0.34) | 99.0% EVA (0.50) 1.0% Violet 23 concentrate | Pale Violet | Tan** |
| 11 | EVA (1.26) | PVDC (0.34) | 98.5% EVA (0.50) 1.5% Violet 23 concentrate | Pale Violet | Tan** |
| 12 | EVA (1.26) | PVDC (0.34) | 98.0% EVA (0.50) 2.0% Violet 23 concentrate | Rose Tan - Pale Violet | Rose Tan** |
| 13 | EVA (1.26) | PVDC (0.34) | 97.0% EVA (0.50) 3.0% Violet 23 concentrate | Medium Violet | Rose Violet |
| 14 | EVA (1.26) | PVDC (0.34) | 96.0% EVA (0.50) 4.0% Violet 23 concentrate | Deep Violet | Deep Rose Violet |
| 15 | EVA (1.39) | PVDC (0.33) | 98.0% EVA (0.64) 2.0% Violet 23 concentrate | Pale Violet | Rose Tan** |
| 16 | EVA (1.39) | PVDC (0.33) | 97.5% EVA (0.64) 2.5% Violet 23 concentrate | Medium Violet | Pale Violet |
| 17 | EVA (1.39) | PVDC (0.33) | 97.0% EVA (0.64) | Deep Violet | Rose Violet |

TABLE II-continued

| Film No. | Layer Structure* | | | Color After Irradiation At 3 megarads | Color After 7 days at 120° F. |
| --- | --- | --- | --- | --- | --- |
| | First Outer Layer | Core Layer | Second Outer Layer | | |
| 18 | EVA (1.42) | PVDC (0.34) | 3.0% Violet 23 concentrate 98.0% EVA (0.64) 2.0% Violet 23 concentrate | Pale Violet | Rose Tan** |
| 19 | EVA (1.42) | PVDC (0.34) | 97.5% EVA (0.64) 2.5% Violet 23 concentrate | Medium Violet | Pale Violet |
| 20 | EVA (1.42) | PVDC (0.34) | 97.0% EVA (0.64) 3.0% Violet 23 concentrate | Deep Violet | Rose Violet |

*Layer thicknesses, in units of mils, appear in parenthesis following layer designations.
**Unacceptable color.

EXAMPLE IV

Biaxially oriented pigmented and unpigmented three layer films having first outer layers comprising an ethylene vinyl acetate copolymer having a vinyl acetate content of 11 weight percent, based on the weight of the copolymer, and a melt index of 0.25 decigrams per minute; core layers comprising a vinylidiene chloride-vinyl chloride copolymer having a vinyl chloride content of 16 weight percent, based on the weight of the copolymer; and second outer layers comprising a blend of (a) 75 weight percent ethylene vinyl acetate copolymer having a vinyl acetate content of 12 weight percent, based on the weight of the copolymer, and a melt index of 0.35 decigrams per minute and (b) 25 weight percent ethylene vinyl acetate copolymer having a vinyl acetate content of 4 weight percent, based on the weight of the copolymer, and a melt index of 0.25 decigrams per minute, were prepared by the "double-bubble" process disclosed in U.S. Pat. No. 3,456,044. The films are more particularly described in Table III. Violet 23 concentrate referred to in Table III is as defined in Example III.

The films were produced by co-extruding the polymeric materials forming the various film layers through a multilayer die to produce a primary tube which was then biaxially stretched to produce an oriented film. Thereafter, a first group of films was maintained at a temperature of 120° F. for a period of 3 days without further treatment. A second group of films was irradiated to a dosage level of 3 megarads following orientation and was thereafter maintained at a temperature of 120° F. for a period of 3 days.

Hunter a, b and L-Values obtained as per the Tristimulus Test herein defined, as well as color data for each group of films, are reported in Table IV. The data presented in Table IV shows that following accelerated aging, both irradiated and non-irradiated films pigmented with Violet 23 retained an aesthetically acceptable violet tint. The data also shows that a given quantity of Violet 23 effectively masks PVDC degradation regardless of whether it is incorporated into one or more film layers.

TABLE III

| Film No. | Film Compositions[1] | | |
| --- | --- | --- | --- |
| | Outer Layer 1 | Core Layer | Outer Layer 2 |
| 21 | EVA (1.45) | PVDC (0.30) | 97.0% EVA (0.65) 3.0% Violet 23 concentrate |
| 22 | EVA (1.85) | PVDC (0.35) | 97.0% EVA (0.80) 3.0% Violet 23 concentrate |
| 23 | EVA (1.45) | 96.2% PVDC (0.30) 3.8% Violet 23 concentrate | EVA (0.65) |
| 24 | 99.3% EVA (1.45) 0.7% Violet 23 concentrate | 99.0% PVDC (0.30) 1.0% Violet 23 concentrate | 99.3% EVA (0.65) 0.7% Violet 23 concentrate |

[1]Layer thicknesses, in units of mils appear in parenthesis following layer designations.

TABLE IV

Hunter Values And Color Data Of 3 Layer PVDC-Containing Films

| Film No. | Non-Irradiated Film Freshly Extruded | | | | Non-Irradiated Film after 3 days at 120° F. | | | | Irradiated Film Freshly Extruded | | | | Irradiated Film After 3 Days At 120° F. | | | |
| --- | --- | --- | --- | --- | --- | --- | --- | --- | --- | --- | --- | --- | --- | --- | --- | --- |
| | L | a | b | Color | L | a | b | Color | L | a | b | Color | L | a | b | Color |
| 21 | 85.8 | +2.1 | −4.2 | medium violet | 85.3 | +2.3 | −4.2 | medium violet | 85.1 | +2.3 | −4.0 | medium violet | 84.8 | +2.2 | −2.6 | pale violet |
| 22 | 85.3 | +2.3 | −4.2 | medium violet | 84.8 | +2.4 | −4.3 | medium violet | 85.8 | +2.4 | −3.9 | medium violet | 84.0 | +2.2 | −1.9 | pale violet |
| 23 | 85.3 | +1.2 | −3.7 | medium violet | 85.2 | +1.4 | −3.8 | medium violet | 85.2 | +1.1 | −2.9 | medium violet | 84.5 | +0.9 | −1.4 | pale violet |
| 24 | 85.0 | +1.8 | −4.2 | medium violet | 84.1 | +2.5 | −4.8 | medium violet | 85.2 | +1.4 | −3.4 | medium violet | 84.2 | +1.5 | −2.1 | pale violet |

What is claimed is:

1. A transparent, heat shrinkable multilayer film comprising:
   (a) at least one layer comprising a vinylidene chloride-vinyl chloride copolymer;
   (b) at least one layer comprising a thermoplastic polymer; and
   (c) a sufficient amount of a dioxazine violet pigment to provide the film with a violet tint after said film is maintained at a temperature of 120° F. for a period of 3 days.

2. A transparent, heat shrinkable multilayer film in accordance with claim 1 wherein said vinylidene chloride-vinyl chloride copolymer layer has been irradiated to a dosage level of at least about one megarad.

3. A transparent, heat shrinkable multi-layer film comprising:
   (a) at least one layer comprising a vinylidene chloride-vinyl chloride copolymer said layer being visually perceived as yellow absent pigmentation thereof;

(b) at least one layer comprising a thermoplastic polymer; and (c) a sufficient amount of a dioxazine violet pigment to provide the film with a Hunter L-Value within a range of from about 80 to about 90, a Hunter a-Value within a range of from about +0.25 to about +6, and a Hunter b-Value within a range of from about −0.25 to about −7, as per the Tristimulus Test.

4. A transparent, heat shrinkable multilayer film comprising:

(a) at least one irradiated layer comprising a vinylidene chloride-vinyl chloride copolymer; and (b) at least one layer comprising a thermoplastic polymer; and (c) a sufficient amount of a dioxazine violet pigment to provide the film with a Hunter L-Value in a range of from about 80 to about 90, a Hunter a-Value in a range of from about +0.25 to about +6, and a Hunter b-Value in a range of from about −0.25 to about −7, as per the Tristimulus Test.

5. A transparent, heat shrinkable multilayer film in accordance with claim 1, wherein said dioxazine violet pigment is a carbazole dioxazine violet of the formula:

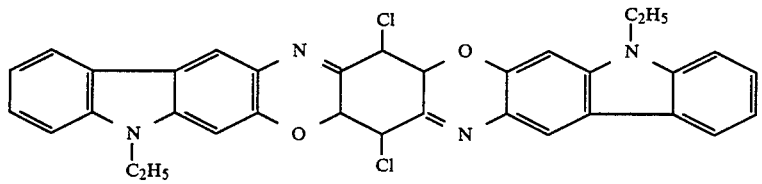

6. A transparent, heat shrinkable multilayer film in accordance with claims 3 and 4 wherein said vinylidene chloride-vinyl chloride copolymer layer has been irradiated to a dosage level between about 3 megarads and about 5 megarads.

7. A transparent, heat shrinkable multilayer film in accordance with claim 1 wherein said pigment is present in said film an amount of from about 0.01 to about 0.04 percent by weight based on the total weight of vinylidene chloride-vinyl chloride copolymer present therein.

8. A transparent, heat shrinkable multilayer film in accordance with claim 1, wherein said vinylidene chloride-vinyl chloride copolymer has a vinylidene chloride content of from about 70 to about 95 weight percent, based on the weight of the copolymer.

9. A transparent, heat shrinkable multilayer film in accordance with claims 1, 3 and 4 wherein said thermoplastic polymer comprises an ethylene-vinyl acetate copolymer.

10. A transparent, heat shrinkable multilayer film in accordance with claim 1 wherein said violet tint is described by a Hunter L-Value within a range of from about 80 to about 90, a Hunter a-Value within a range of from about +0.25 to about +6, and a Hunter b-Value within a range of from about −0.25 to about −7, as per the Tristimulus Test.

11. A transparent, heat shrinkable multilayer film which comprises:

(a) a layer comprising a vinylidene chloride-vinyl chloride copolymer irradiated to a dosage level of at least about 1 megarad;

(b) at least one layer comprising a thermoplastic polymer; and (c) from about 0.01 to about 0.04 percent by weight, based on the total weight of the vinylidene chloride-vinyl chloride copolymer, of a carbazole dioxazine pigment.

12. A transparent, heat shrinkable multilayer film in accordance with claim 11 wherein the carbazole dioxazine pigment is of the formula:

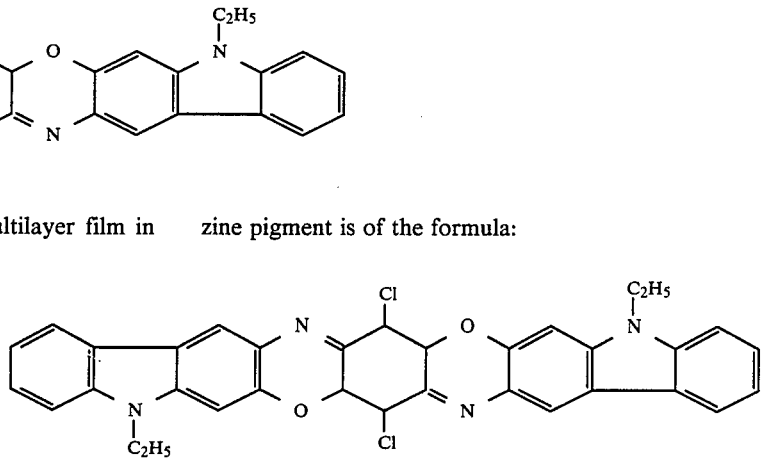

and the vinylidene chloride-vinyl chloride copolymer layer has been irradiated to a dosage level between about 3 megarads and about 5 megarads.

13. A transparent, heat shrinkable multilayer film in accordance with claim 4 wherein said film retains a Hunter L-Value within a range of from about 80 to about 90, a Hunter a-Value within a range of from about +0.25 to about +6, and a Hunter b-Value within a range of from about −0.25 to about −7 after being maintained at a temperature of 120° F. for a period of 3 days.

14. A bag suitable for use in meat packaging applications formed from the film of claim 1.

* * * * *